United States Patent
Bernhart

[15] 3,649,295
[45] Mar. 14, 1972

[54] HUMANIZED FAT COMPOSITIONS AND INFANT FORMULAS THEREOF

[72] Inventor: Finn W. Bernhart, Radnor, Pa.

[73] Assignee: American Home Products Corporation, New York, N.Y.

[22] Filed: June 1, 1970

[21] Appl. No.: 42,550

[52] U.S. Cl. ..............................................99/57, 99/118 R
[51] Int. Cl. ....................................A23c 21/00, A23d 5/00
[58] Field of Search ....................99/57, 118 R, 118 F, 54, 55

[56] References Cited

UNITED STATES PATENTS

| | | | |
|---|---|---|---|
| 2,604,403 | 7/1952 | Wiechers | 99/55 |
| 2,611,706 | 9/1952 | Bernhart et al. | 99/118 R |
| 3,099,564 | 7/1963 | Gooding | 99/118 R |
| 3,186,854 | 6/1965 | Going | 99/118 R X |
| 3,201,245 | 8/1965 | Clark et al. | 99/57 |
| 3,201,256 | 8/1965 | Clark et al. | 99/54 X |
| 3,320,072 | 5/1967 | Clark et al. | 99/54 X |
| 3,529,974 | 9/1970 | Melnick et al. | 99/118 F |
| 3,542,560 | 11/1970 | Tomarelli et al. | 99/57 X |

*Primary Examiner*—S. Leon Bashore
*Assistant Examiner*—Frederick Frei
*Attorney*—Andrew Kafko, Joseph Martin Weigman, Dwight J. Potter, Vito Victor Bellino and Robert Wiser

[57] ABSTRACT

Edible, highly assimilable, fat compositions of oleic oil; coconut or babassu oil; oleo oil; and, optionally, a seed oil and/or soy lecithin. Also disclosed are infant formulas incorporating said edible, highly assimilable, fat composition.

12 Claims, No Drawings

HUMANIZED FAT COMPOSITIONS AND INFANT FORMULAS THEREOF

This invention concerns new and novel edible, highly assimilable, fat compositions. Additionally, this invention concerns food products particularly adapted for human infant nutrition (formula) incorporating the edible, highly assimilable fat compositions.

More particularly, this invention concerns new and novel edible, highly assimilable, fat compositions with a fatty acid composition resembling that of human milk fat consisting of, by weight, from about 15 percent to about 45 percent of oleic oil; from about 10 percent to about 45 percent of oleo oil; from 0 percent to about 25 percent of a seed oil selected from the group consisting of soybean oil, corn oil, peanut oil, sunflower seed oil and cottonseed oil; from about 10 percent to about 35 percent of a member selected from the group consisting of coconut oil and babassu oil; and from 0 percent to about 2 percent of soy lecithin: and infant formulas incorporating said edible oil composition.

Breast feeding of all infants for at least 6 months offers the best nutrition and greatest resistance to disease. Unfortunately, only about 10 percent of infants in the United States are breast-fed at 1 month of age. The reasons for the superiority of breast-feeding have not been elucidated. However, the point of view that "humanized" infant formulas, i.e., formulas similar to human milk in chemical composition supply the best nutrition for artificially fed infants is well established. Over 80 percent of all artificially fed infants in the United States during 1969 were fed "humanized" infant formulas.

Improvement in "humanized" infant formulas in respect to mineral protein and carbohydrate components (U.S. Pat. Nos. 2,604,403; 3,201,245; 3,201,256 and 3,320,072) have resulted in a formula in which these essential nutrients are present in amounts similar to those in human milk and which closely approximate the nutritional properties of human milk both in respect to absorption from the intestine and in metabolism for growth and maintenance. However, the fat mixtures utilized in "humanized" infant formulas have not been found as satisfactory in infant nutrition as the other nutritional components.

It has been known for many years that the fatty acid composition of dietary fat influences the fatty acid composition of the adipose tissue. Recently, the influence of dietary fat on the composition of lipids present in all cells of the body including nerve and brain cells has been pointed out. The short or long term implications of changes in the fatty acid composition of the structural lipids of actively metabolizing cells of the young infant resulting from ingestion of fats supplying fatty acids widely divergent from the amounts supplied by human milk are unknown. In the absence of knowledge, teleological reasoning supports the view that the amounts of fatty acids supplied by infant formulas should approach the amounts supplied by human milk.

In addition, specific difficulties with fat mixtures used in infant formulas have been pointed out. Widdowson (Lancet, Nov. 27, 1965, 1099:1965) found that the fat in an artificial formula with approximately the same fatty acid composition as breast milk fat was not well absorbed in young infants. Of greater importance was the finding that the lowered fat absorption resulted in low and in some infants negative absorption of calcium. The low-absorption results from binding of calcium by unabsorbed fatty acids, particularly palmitic and stearic acids, forming highly insoluble soaps.

Another variety of fat compositions used in humanized infant formulas are characterized by levels of fatty acids, greatly different from those present in human milk fat. A syndrome consisting of edema, skin lesions, an elevated platelet count and morphologic changes in erythrocytes has been described in premature infants fed formulas containing fat with a relatively high content of linoleic acid (Hassan, H. et al., Am. J. Clin. Nutr. 19, 147:1966). Oski F. and L. Barness, J. Pediat. 70, 211:1967) described a hemolytic anemia in premature infants fed formulas with high-linoleic acid content. In both studies, the findings were reversed by administration of vitamin E. Neurological pathology resulted in death of an infant fed high levels of linoleic acid without added vitamin E (Horwitt, M. and P. Bailey [Arch. Neurol. 1, 312:1959]).

The object of this invention is to provide a "humanized" fat mixture suitable for use in infant formulas which is well absorbed from the intestine and at the same time provide a physiological level of linoleic acid using commercially available, reasonably priced fats and oils. At the present state of the art, these objectives have not been achieved.

The reasons for not obtaining both objects is due to the fatty acid composition of available fats and oils. Fatty acids are absorbed to different extents by the new born infant. Stearic acid ($C18:0$) and palmitic acid ($C16:0$) are poorly absorbed from the infant intestine. All the other fatty acids are absorbed to a considerably greater extent than stearic and palmitic acid. Oleic acid ($C18:0$) is intermediate in the extent of absorption. Therefore, one object of this invention is to provide a fat mixture which approximates the composition of human milk fat and provides for absorption characteristics similar to that of milk fat. A further object of this invention is to provide a food product particularly adapted for infant nutrition substantially approximating human milk containing the above-described fat composition. Table I lists classes of animal and vegetable fats used in infant formulas together with the ranges of the fatty acids which comprise in each case over 90 percent of the total present.

TABLE I

| | % of total fatty acids | | | |
|---|---|---|---|---|
| | 1 Palmitic Acid Oils | 2 Lauric Acid Oils | 3 Animal Fats | 4 Seed Oils |
| Palmitic Acid | 42 | 7-9 | 25-29 | 8-21 |
| Stearic Acid | 4 | 1-4 | 13-30 | 2-4 |
| Linoleic acid | 9 | 1-2 | 2-6 | 22-60 |
| Oleic acid | 43 | 6-14 | 32-42 | 27-29 |
| Lauric acid | 0 | 45-48 | 0 / 32-42 | 0 / 27-29 |
| Lauric Acid | 0 | 45-48 | 0 | 0 |

The fats which are used in existing infant formulas are grouped into four classes, as follows:

I. Palmitic acid oils
  palm oil
II. Lauric acid oils
  coconut
  babassu
III. Animal fats
  oleo oil (beef fat)
IV. Seed oils
  corn
  peanut
  soybean
  cottonseed oil Among the palmitic acid oils and lauric acid oils, the ones listed above include all members of these classes. The other commercial, animal fats (butter, lard, mutton tallow) are not used because of economic considerations (butter), religious prejudice (lard) and relative unavailability (mutton tallow). The other available seed oils are not considered suitable for various reasons: linseed because of containing over 50 percent linolenic acid; olive oil because of uneconomical price, safflower because it contains over 70 percent linoleic acid; sesame seed oil because of the presence of phenolic compounds and sunflower oil because of unavailability.

Some of the fat compositions used in commercially prepared infant formulas together with their fatty acid composition are shown in Table II. Inspection of the table shows that no combination of presently used fats and oils have achieved the purposes of this invention. With every composition where the absorption of fat is high, the linoleic acid content or lauric acid content is above the human milk range. In formulations where the linoleic acid content is in the range of human milk, the absorption is low.

In Table II, the fat mixtures denominated 1-6 are presently available in commercial infant formulas. Following each fat mixture ingredient is the percent, by weight, of the fat in the mixture. The fat mixtures are then identified by the type and amount (percent by weight) of the fatty acids making up the mixture. Each fatty acid is identified by the length of the carbon chain and number of unsaturated positions, i.e., lauric acid contains 12 carbon atoms and is fully saturated. It is possible to estimate the percent of fat absorption based on the sum of palmitic and stearic acids in the fat mixtures. A high percent of absorption is expected for mixtures containing less than 15 percent stearic and palmitic acids. In fat mixtures 2 and 4, the linoleic acid level is high and the percent of absorption is high. In formula 3, the lauric and linoleic acid levels are both high and the percent of absorption is high. In formula 5, the linoleic acid is in the range of human milk fat and the percent of absorption is low. In formula 6, the linoleic acid level is high and the percent of absorption is poor.

Recent research in the area of vegetable oil production has produced a safflower oil which contains a high level of oleic acid (about 80 percent) and a low level of linoleic acid (about 15 percent) which is in the reverse ratio found in normally occurring safflower oil. This new oil derived from a genetic mutant of common safflower has been assigned by the National Institute of Oil Manufacturers, the generic name of oleic oil (Oleinate 181, Pacific Vegetable Oil Corporation, Richmond, California).

Within the range of fat compositions within the scope of this invention, particular interest is directed to compositions consisting of from about 25 percent to about 35 percent of oleic oil; from about 30 percent up to about 40 percent of oleo oil; from about 10 percent to about 20 percent of soybean oil; from about 20 percent to about 30 percent of coconut oil; and about 1 percent of soy lecithin.

In Table III are listed the fat blends (mixtures) which are incorporated into humanized infant formula and tested by feeding to 7 to 10 day old infants and measuring total fat and calcium absorption. These fat blends are identified similarly to those listed in Table II. Formula J is the preferred composition of this invention. This is the only composition which is as well absorbed from the intestine as human milk and from which the calcium present is as well absorbed as human milk. This result was unexpected as the palmitic and stearic acid contents (poorly absorbed fatty acids) are similar to formula A. The reason why unexpectedly high fat and calcium absorptions

TABLE II

| Fat mixture | Approximate composition | Percent of total fatty acids by weight | | | | | | | |
|---|---|---|---|---|---|---|---|---|---|
| | | Shorter than lauric, 12:0 | Lauric, 12:0 | Myristic, 14:0 | Palmitic, 16:0 | Stearic, 18:0 | Oleic, 18:1 | Linoleic, 18:2 | Linolenic, 18:3 |
| 1 | Human milk | 1.6 | 7.0 | 8.8 | 21.0 | 7.2 | 35.8 | 7.5 | 0.8 |
| | Avg. range | 0.9–2.8 | 2.8–10.8 | 5.9–12.1 | 17.6–24.6 | 6.4–9.0 | 28–41 | 4.3–13 | 0.5–1.1 |
| 2 | Coconut oil (40%) / Corn oil (60%) | 6.3 | 20 | 7.4 | 11 | 2.5 | 19.1 | 32 | 0.6 |
| 3 | Coconut oil (75%) / Corn oil (15%) / Soybean oil (10%) | 10 | 35 | 13.3 | 10 | 2.8 | 12.3 | 16 | 0.6 |
| 4 | Corn oil (100%) | 0 | 0.1 | 0.2 | 11 | 2.4 | 27 | 57 | 0.8 |
| 5 | Coconut oil (25%) / Palm oil (65%) / Peanut oil (10%) | 3.4 | 12 | 5.1 | 27 | 4.1 | 32 | 14 | 0.3 |
| 6 | Coconut oil (20%) / Corn oil (47%) / Oleo oil (33%) | | 10 | 5.1 | 17 | 8.8 | 29 | 24 | 0.4 |

Additionally, the palmitic acid in human milk fat (26 percent) is 32 percent in the 1,3-position on the glyceride molecule, whereas the palmitic acid derived from vegetable sources is 82 percent in the 1,3-position. A reasonably good correlation is found between the products of the 1,3-palmitic acid x stearic acid contents of a fat and the amount of the total fat not absorbed. See U.S. Pat. application, Ser. No. 688,326, filed on Dec. 6, 1967 by R. M. Tomarelli and F. W. Bernhart now U.S. Pat. No. 3,542,560.

were found cannot be predicted from present knowledge of fatty acid and calcium absorption from the intestine. Possibly, the reason lies in the high ratio of oleic to stearic acid. Also unexpected was the finding that infants fed formula J gain more weight.

The preferred composition is also the only one of the nine compositions listed in Tables II and III which has a linoleic acid content within the range found in human milk.

TABLE III

| Fat mixture | Percent of total fatty acids by weight [1] | | | | | | | | Fat and calcium absorption in 7–10 day old infants [2] | |
|---|---|---|---|---|---|---|---|---|---|---|
| | Shorter than lauric, >12:0 | Lauric, 12:0 | Myristic, 14:0 | Palmitic, 16:0 | Stearic, 18:0 | Oleic, 18:1 | Linoleic, 18:2 | Linolenic, 18:3 | Percent fat absor. | Percent Ca absor. |
| Human milk | 1.2 | 4.3 | 6.4 | 24.3 | 9.1 | 33.0 | 11.3 | 0.5 | 85.0 | 43.9 |
| A.: Coconut oil (23%) / Corn oil (12%) / Soybean oil (25%) / Oleo oil (40%) | 3.7 | 11.6 | 5.5 | 16.4 | 9.5 | 26.2 | 21.2 | 2.1 | 84.6 | 20.1 |
| C.: Oleo oil (25%) / Coconut oil (20%) / Palm oil (35%) / Peanut oil (20%) | 2.7 | 11.3 | 5.9 | 25.5 | 8.0 | 32.5 | 10.6 | 0.3 | 81.7 | 21.1 |
| H.: Coconut oil (17.5%) / Corn oil (10%) / Soybean oil (16.5%) / Oleo oil (55%) | 3.0 | 6.4 | 4.0 | 18.7 | 13.4 | 32.5 | 18.1 | 2.6 | 79.2 | 5.4 |

1.:

| | | | | | | | | | | |
|---|---|---|---|---|---|---|---|---|---|---|
| Oleic oil (25%) | | | | | | | | | 89.8 | 45.7 |
| Oleo oil (33%) | 3.3 | 12.3 | 6.0 | 13.5 | 8.4 | 39.5 | 11.9 | 2.6 | | |
| Soybean oil (15%) | | | | | | | | | | |
| Coconut oil (27%) | | | | | | | | | | |

¹ The fatty acid compositions listed are for the samples actually tested.
² Ten infants in each group.

The edible fat compositions of this invention, because of their suprisingly high absorption and beneficial effect on calcium absorption, are especially suited for incorporation into food products particularly adapted for human infant nutrition (formula). Basically, such an infant formula would be composed of the edible fat composition herein previously described, a protein source and a sugar. A typical useful protein source is electrodialyzed whey and/or electrodialyzed skim milk such as that described in U.S. Pat. No. 3,320,072, although other protein sources are available. Sugars would include substances such as glucose; however, edible lactose is preferred. Additionally, such infant formulas would include the following vitamins and minerals: calcium, phosphorous, potassium, sodium, chloride, magnesium, iron, copper, zinc, iodine, vitamins A, D, E and the B vitamins. These substances would be added in the form of commonly accepted nutritional compounds in amounts recommended by the National Research Council or other accepted nutritional body. A typical infant formula at ready-to-feed concentration would provide 20 kcal./fl. oz. and provide in each 100 ml., 3.6 g. of fat blend, 1.5 g. of protein, 7.2 g. lactose and has 0.25 g. of ash.

The fat compositions of this invention also are incorporated into aqueous infant formula compositions comprising the edible fat composition, a sugar, nonfat milk, water and, optionally, a protein source. Exemplary formulas of this type would comprise an aqueous suspension containing in each 100 ml. from about 1.00 to about 6.00 g. of the edible fat composition; from about 1.0 to about 2.5 g. of a protein source; and from about 2.0 to about 15 g. of a sugar. Particularly, a food product particularly adapted for infant nutrition substantially approximating human milk in composition comprising an aqueous suspension containing in each 100 ml. about 3.6 g. of the edible fat composition; about 1.5 g. of a protein source; and about 7.2 g. of sugar.

The following examples provide representative embodiments of this invention. They are merely illustrative and are not to be construed to limit the scope of the claims in any manner whatsoever.

EXAMPLE I

Compositions of edible fat blend are provided as set forth in Table IV, following:

TABLE IV

| OIL | A | B | C | D | E | F | G | H | I | J |
|---|---|---|---|---|---|---|---|---|---|---|
| Oleic Oil | 25 | 25 | 45 | 15 | 20 | 43 | 42 | 39 | 30 | 27 |
| Oleo Oil | 33 | 33 | 10 | 26 | 35 | 10 | 10 | 30 | 45 | 17 |
| Soybean Oil | 14 | 15 | — | — | 10 | — | 7 | — | — | 24 |
| Corn Oil | — | — | 25 | 12 | — | — | — | — | 15 | — |
| Cottonseed Oil | — | — | — | 12 | — | 15 | 7 | — | — | — |
| Coconut Oil | 27 | 27 | — | 35 | 34 | 15 | — | 30 | 10 | 31 |
| Babassu Oil | — | — | 20 | — | — | 15 | 34 | — | — | — |
| Soy Lecithin | 1 | — | — | — | 1 | 2 | — | 1 | — | 1 |

EXAMPLE II

Using the fat composition of Table IV, Column A, the following ready-to-feed infant formula is provided, amounts set forth in 100 ml.

| | |
|---|---|
| Fat Composition | 3.6 g. |
| Lactose | 7.2 g. |
| Protein (Electrodialyzed Whey and Non-Fat Milk) | 1.5 g. |
| Vitamin A U.S.P. units | 264 |
| Vitamin D U.S.P. units | 42.0 |
| Vitamin E I.U. | 0.64 |
| Vitamin B₁ (Thiamine HCl) | mg. 0.071 |
| Pantothenic Acid | mg. 0.21 |
| Vitamin B₂ (Riboflavin) | mg. 0.11 |
| Vitamin C (Ascorbic Acid) | mg. 5.3 |
| Vitamin B₆ (Pyridoxine HCl) | mg. 0.042 |
| Vitamin B₁₂ (Cyanocobalamin) | mcg. 0.11 |
| Niacinamide | mg. 0.53 |
| Folic Acid | mcg. 3.2 |
| Calcium | mg. 42 |
| Phosphorus | mg. 33 |
| Sodium | mg. 15 |
| Potassium | mg. 55 |
| Chloride | mg. 41 |
| Magnesium | mg. 6.0 |
| Iron | mg. 0.85 |
| Copper | mg. 0.04 |
| Zinc | mg. 0.32 |
| Iodine | mcg. 6.9 |
| Water | qsad. 100.0 ml. |

The fat soluble vitamins are dissolved in the fat composition and the remaining ingredients are dissolved in the water. The fat composition and water solution are then mixed and homogenized. Adequate amounts of other trace minerals are present in the electrodialyzed whey and nonfat milk. The process is repeated using the other fat composition of Example I.

What is claimed:

1. An edible, highly assimilable, fat composition consisting of, by weight, from about 15 percent to about 45 percent of oleic oil; from about 10 percent to about 45 percent of oleo oil; from 0 percent to about 25 percent of a seed oil selected from the group consisting of soybean oil, corn oil, peanut oil, sunflower seed oil and cottonseed oil; from about 10 percent to about 35 percent of a member selected from the group consisting of coconut oil and babassu oil; and from 0 percent to about 2 percent of soy lecithin.

2. The composition of claim 1 consisting of from about 25 percent to about 35 percent of oleic oil; from about 30 percent to about 40 percent of oleo oil; from about 10 percent to about 20 percent of soybean oil; and from about 20 percent to about 30 percent of coconut oil.

3. The composition of claim 2 consisting of about 25 percent oleic oil; about 33 percent of oleo oil; about 15 percent of soybean oil; about 27 percent of coconut oil.

4. An aqueous food product particularly adapted for human infant nutrition comprising: the edible fat composition of claim 1, a protein source; a sugar; and water.

5. An aqueous food product particularly adapted for infant nutrition comprising an aqueous suspension containing in each 100 ml. from about 1.00 to about 6.00 g. of the edible fat composition of claim 1; from about 1.0 to about 2.5 g. of a protein source; and from about 2.0 to about 15 g. of a sugar.

6. A food product particularly adapted for infant nutrition substantially approximating human milk in composition, comprising: an aqueous suspension containing in each 100 ml. about 3.6 g. of the edible fat composition of claim 4; about 1.5 g. of a protein source; and about 7.2 g. of sugar.

7. A composition of claim 4 wherein said protein source is electrodialyzed whey and said sugar is lactose.

8. A composition of claim 5 wherein said protein source is electrodialyzed whey and said sugar is lactose.

9. A composition of claim 6 wherein said protein source is electrodialyzed whey and said sugar is lactose.

10. A food product particularly adapted for infant nutrition substantially approximating human milk in composition and nutritional content, comprising: an aqueous suspension containing in each 100 ml. about 3.6 g. of the edible fat composition of claim 4; about 1.5 g. of protein from electrodialyzed whey and nonfat milk; and about 7.2 g. of lactose, said food product having an ash content of about 0.25 g./100 ml. and supplying about 20 kcal./fl. oz.

11. An aqueous food product adapted for human infant nutrition comprising: the edible fat composition of claim 1; a protein source; a sugar; skim milk; and water.

12. An aqueous food product adapted for human infant nutrition comprising: the edible fat composition of claim 1; a sugar; nonfat milk; and water.

* * * * *